(No Model.) 2 Sheets—Sheet 1.
R. S. HIGGINS.
FEED TROUGH.
No. 489,808. Patented Jan. 10, 1893.
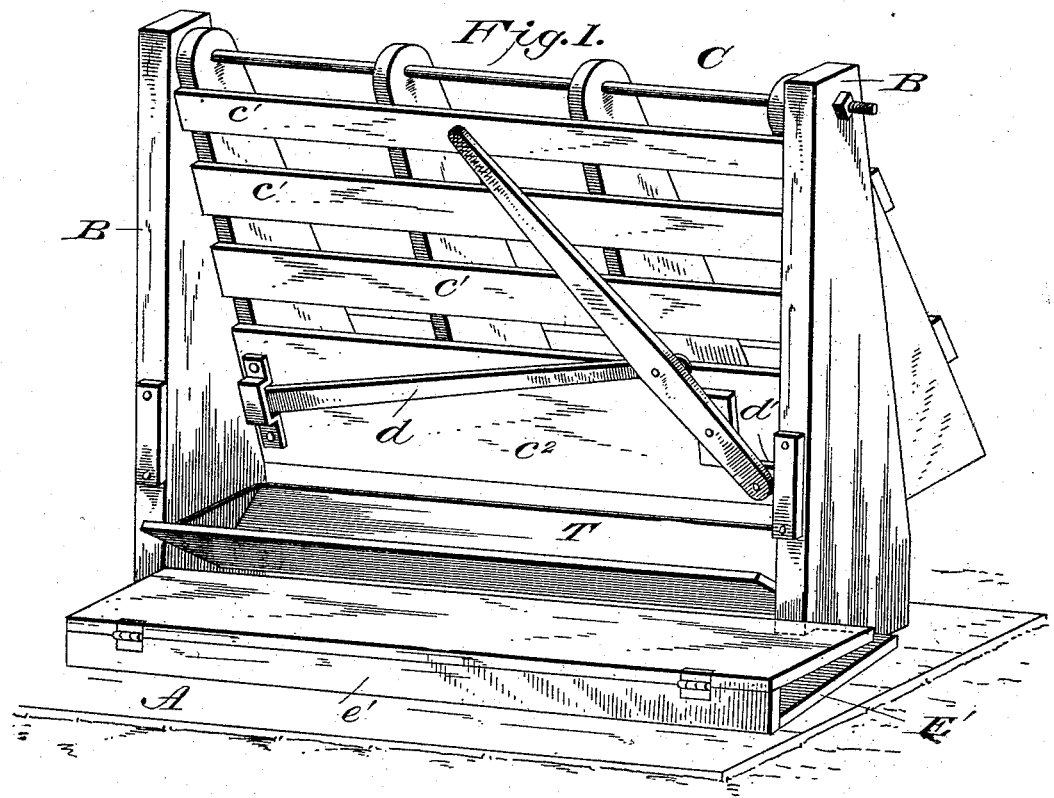
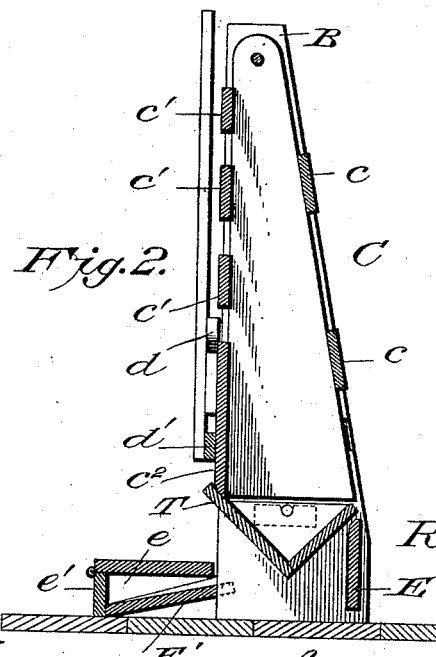

(No Model.) 2 Sheets—Sheet 2.
R. S. HIGGINS.
FEED TROUGH.
No. 489,808. Patented Jan. 10, 1893.
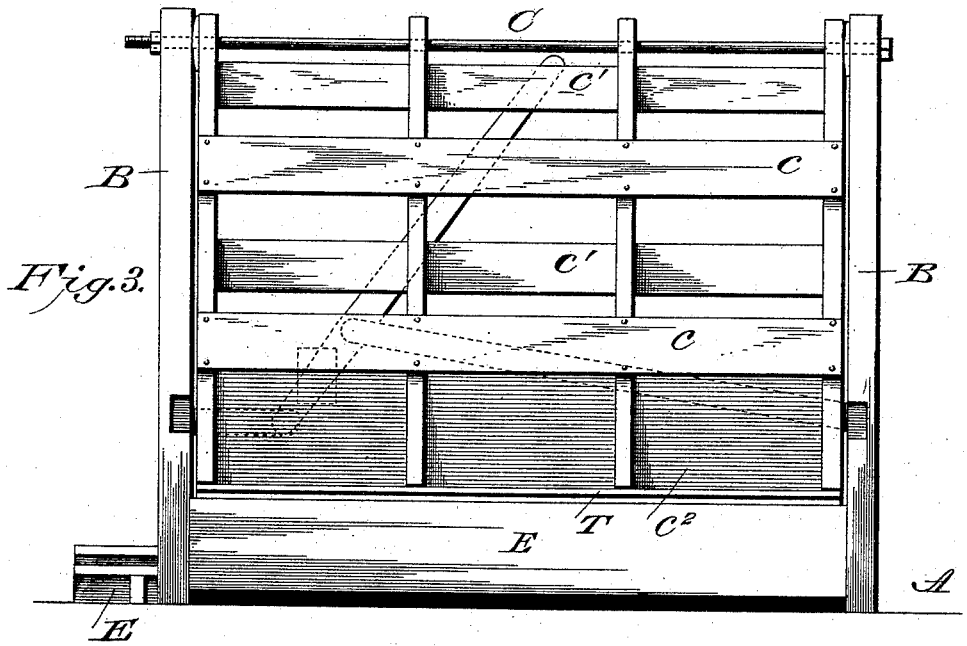
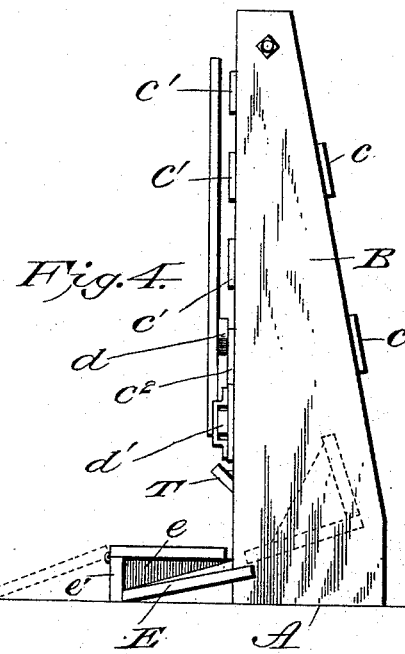

UNITED STATES PATENT OFFICE.

ROZANDER S. HIGGINS, OF NEOGA, ILLINOIS.

FEED-TROUGH.

SPECIFICATION forming part of Letters Patent No. 489,808, dated January 10, 1893.

Application filed August 11, 1892. Serial No. 442,741. (No model.)

*To all whom it may concern:*

Be it known that I, ROZANDER S. HIGGINS, a citizen of the United States of America, residing at Neoga, in the county of Cumberland and State of Illinois, have invented certain new and useful Improvements in Feed-Troughs; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in feed troughs, the object of which is to provide a feed trough which will be simple in construction, and by means of which the trough proper can be readily emptied or cut off from the pen when desired; and the invention consists in the construction and combination of the parts, as will be hereinafter fully set forth and particularly pointed out in the claims.

In the accompanying drawings, forming part of this specification: Figure 1 is a perspective view showing the trough in a position for filling. Fig. 2 is a vertical sectional view. Fig. 3 is a front elevation, and Fig. 4 an end view.

A designates the base of the trough, which is provided with vertical supports B B, to the upper ends of which is hung a swinging frame C having vertical pieces which taper upwardly, and to said vertical pieces are attached cross strips $c$ $c'$ and $c^2$, as shown in the drawings. The lower strip, $c^2$, which lies adjacent to the trough is of greater width than the other cross strips, and to the same is pivoted a lever having locking bars $d$ and $d'$, which pass through suitable guides or loops and are adapted to engage either with recesses in one side of the supports B to hold the swinging frame beyond the trough, or with blocks upon the opposite side of said supports to retain the frame immediately above the trough. When the swinging frame is located above the trough it will partition the same off and will keep the hogs or other animals feeding out of the trough separated; and the lower edges of the vertical pieces $C^2$ of this swinging frame will contact with the upper edge of the trough and prevent the same being tilted.

E designates a board which is secured near the lower ends of the supports B so as to prevent the animals rooting under the trough or in any other manner upsetting the same.

To the rear ends of the uprights or supports B is secured a board E', which is inclined in two directions, and is provided with an upwardly projecting end piece $e$ and a vertical strip $e'$ to which is hinged a suitable cover. When the trough T is tilted the contents thereof may be deposited upon the board, and when the cover is folded over to rest upon the board E' it forms a convenient platform, upon which the person filling the trough may stand. By providing this inclined board and cover the trough when emptied will not leave the usual puddle, and the attendant has a clean platform to stand on. An ordinary draining trench may lead from the inclined board. The trough T is pivoted to the inner sides of the uprights, and one of the sides thereof is of greater width than the other.

In use, when it is desired to fill the trough the swinging frame is swung inwardly or toward the pen and secured in such position by the levers and bars carried thereby, and the wide cross-strip $c^2$ to which the lever is pivoted in connection with the board E will cut off all communication between the pen and trough. When the trough has been filled the bars are released and the swinging frame will assume a vertical position, the lower edges thereof contacting with the upper edges of the inclined boards forming the trough will thus prevent the trough being tilted, the pressure of the partition pieces also forcing the narrower board of the trough against the upper edge of the board E. It will be noted that to accomplish this result the wide ends of the vertical pieces of the swinging frame are cut at right angles with the rear edge which carries the cross strip $c^2$, and that the lower edge of this cross strip is beveled for engagement with the wider board of the trough which projects above the end pieces thereof. The trough is hung by trunnions as shown, so that it may be removed from the frame when desired.

I am aware that prior to my invention it has been proposed to provide an animal trough with a swinging frame with partitions to separate the animals from each other, and means for holding the swinging frame in such positions that it may be placed, and I therefore do not claim such construction broadly; but What I do claim as new, and desire to secure by Letters-Patent, is:

1. In an animal trough or stock feeder, the combination of uprights supporting a swinging frame and a trough, said trough being made up of end pieces and longitudinal inclined boards one of which is extended upward to contact with the swinging frame, and a receptacle located to one side of the trough, substantially as shown, and for the purpose set forth.

2. In combination with a pivoted trough, a receptacle adjacent thereto, said receptacle consisting of an inclined bottom board and a vertical side board to which a cover is hinged, said cover being adapted to fold over the receptacle, for the purpose set forth.

3. In an animal trough or stock feeder, the combination of a pivoted trough one of the sides of which is of greater width than the other, an inclined receptacle E' secured adjacent to the wider side of the trough, and a cover for said receptacle, substantially as shown.

In testimony whereof I affix my signature in presence of two witnesses.

ROZANDER S. HIGGINS.

Witnesses:
M. A. EWING,
N. CROOKSHANK.